United States Patent
Rapoport et al.

(10) Patent No.: US 9,667,862 B2
(45) Date of Patent: May 30, 2017

(54) METHOD, SYSTEM, AND COMPUTER PROGRAM PRODUCT FOR GAMIFYING THE PROCESS OF OBTAINING PANORAMIC IMAGES

(71) Applicant: Google Inc., Mountain View, CA (US)

(72) Inventors: Evan Rapoport, Los Altos, CA (US); Scott Ettinger, San Carlos, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/990,238

(22) Filed: Jan. 7, 2016

(65) Prior Publication Data

US 2016/0119537 A1    Apr. 28, 2016

Related U.S. Application Data

(63) Continuation of application No. 13/662,073, filed on Oct. 26, 2012, now Pat. No. 9,270,885.

(51) Int. Cl.
*H04N 21/00* (2011.01)
*H04N 5/232* (2006.01)
(Continued)

(52) U.S. Cl.
CPC ....... *H04N 5/23222* (2013.01); *G06T 3/4038* (2013.01); *H04N 1/00183* (2013.01);
(Continued)

(58) Field of Classification Search
CPC .... H04N 7/00; H04N 5/23238; H04N 1/3876; H04N 9/8205; H04N 21/84;
(Continued)

(56) References Cited

U.S. PATENT DOCUMENTS 7,424,218 B2   9/2008   Baudisch et al.
7,535,492 B2   5/2009   Kahn et al.
(Continued)

FOREIGN PATENT DOCUMENTS

AU   2008212499 A1   12/2008
DE   10156414 A1   9/2002
(Continued)

OTHER PUBLICATIONS

International Search Report and Written Opinion for Application No. PCT/US2013/029772 dated May 21, 2013.
(Continued)

*Primary Examiner* — Frank Huang
(74) *Attorney, Agent, or Firm* — Lerner, David, Littenberg, Krumholz & Mentlik, LLP

(57) ABSTRACT

Systems, methods, and computer readable mediums are provided to generate a number of targets for a panoramic image, each of the targets defining a portion of the panoramic image, monitor a position of a user device with respect to a current target, responsive to determining that the user device is properly positioned with respect to the current target, capture a first image for the current target using a camera of the user device, monitor the position of the user device with respect to a next target, responsive to determining that the user device is properly positioned with respect to the next target, capture a second image for the next target using the camera of the user device; and generate the panoramic image using the first image and the second image.

17 Claims, 12 Drawing Sheets

(51) Int. Cl.
*G06T 3/40* (2006.01)
*H04N 1/00* (2006.01)
*H04N 21/414* (2011.01)
*H04N 21/4223* (2011.01)
*H04N 21/478* (2011.01)
*H04N 101/00* (2006.01)

(52) U.S. Cl.
CPC ..... *H04N 5/23206* (2013.01); *H04N 5/23216* (2013.01); *H04N 5/23238* (2013.01); *H04N 5/23293* (2013.01); *H04N 21/41407* (2013.01); *H04N 21/4223* (2013.01); *H04N 21/4781* (2013.01); *H04N 2101/00* (2013.01)

(58) Field of Classification Search
CPC ............... H04N 21/4788; H04N 5/781; H04N 2201/3214; H04N 2201/3215; H04N 2201/3253; G03B 37/04; G06K 9/32; G06K 9/00; G06F 17/30265; G06T 11/00
See application file for complete search history.

(56) References Cited

U.S. PATENT DOCUMENTS

| | | | |
|---|---|---|---|
| 7,936,915 | B2 | 5/2011 | Brown et al. |
| 8,120,641 | B2 | 2/2012 | Kang et al. |
| 8,189,964 | B2 | 5/2012 | Flynn et al. |
| 8,310,522 | B2 | 11/2012 | Jeong et al. |
| 8,600,194 | B2 * | 12/2013 | Doepke ................ G06T 3/4038 345/36 |
| 8,655,620 | B2 * | 2/2014 | Chen .................... G06F 1/1694 348/37 |
| 8,773,502 | B2 * | 7/2014 | Rapoport ........... H04N 5/23258 348/158 |
| 8,902,335 | B2 * | 12/2014 | Doepke ................ G06T 3/4038 348/218.1 |
| 8,933,986 | B2 * | 1/2015 | Schall .................. G06T 3/4038 348/37 |
| 8,941,716 | B2 * | 1/2015 | Matsumoto ............ G03B 37/00 348/36 |
| 8,957,944 | B2 * | 2/2015 | Doepke .............. H04N 5/23238 348/211.4 |
| 2002/0107965 | A1 | 8/2002 | Piccionelli |
| 2005/0206743 | A1 | 9/2005 | Sim et al. |
| 2006/0079200 | A1 | 4/2006 | Hirouchi et al. |
| 2007/0024527 | A1 | 2/2007 | Heikkinen et al. |
| 2008/0045236 | A1 | 2/2008 | Nahon et al. |
| 2008/0118184 | A1 * | 5/2008 | Panabaker ........ G06F 17/30265 382/294 |
| 2008/0119131 | A1 | 5/2008 | Rao |
| 2009/0157876 | A1 | 6/2009 | Lection |
| 2010/0009700 | A1 | 1/2010 | Camp, Jr. et al. |
| 2010/0161506 | A1 | 6/2010 | Bosenick et al. |
| 2010/0309225 | A1 | 12/2010 | Gray et al. |
| 2011/0071843 | A1 | 3/2011 | Gilvar et al. |
| 2011/0102605 | A1 | 5/2011 | Hannaford |
| 2011/0154264 | A1 | 6/2011 | Aravamudan et al. |
| 2011/0161002 | A1 | 6/2011 | DeVries et al. |
| 2011/0165893 | A1 | 7/2011 | Hyung et al. |
| 2011/0169947 | A1 | 7/2011 | Gum et al. |
| 2011/0234750 | A1 * | 9/2011 | Lai ........................ G03B 37/04 348/37 |
| 2011/0312374 | A1 | 12/2011 | Chen et al. |
| 2012/0076426 | A1 | 3/2012 | Kim et al. |
| 2012/0300020 | A1 | 11/2012 | Arth et al. |
| 2013/0033568 | A1 | 2/2013 | Kim et al. |

FOREIGN PATENT DOCUMENTS

| | | |
|---|---|---|
| KR | 2010124947 | 11/2010 |
| WO | 2009086235 A2 | 7/2009 |
| WO | 2010090906 A2 | 8/2010 |
| WO | 2011059780 A1 | 5/2011 |
| WO | 2012131151 A1 | 10/2012 |

OTHER PUBLICATIONS

Nurminen, Antii, "Mobile 3D City Maps", IEEE Computer Graphics and Applications, Jul./Aug. 2008, pp. 20-31.

Dao, et al., "Location Based Services: Technical and Service Issues", GPS Solutions, 2002.

ISR/WO for PCT App. No. PCT/US12/59853, mailed Mar. 8, 2013 (pp. 1-10).

Co-pending U.S. Appl. No. 13/272,556 entitled "Method, System, and Computer Program Product for Obtaining Images to Enhance Imagery Coverage" by David Bort, filed Oct. 13, 2011.

Co-pending U.S. Appl. No. 13/315,748 entitled "Method, System and Computer Program Product for Obtaining Crowd-Sourced Location Information" by Martha Welsh, filed Dec. 9, 2011.

Co-pending U.S. Appl. No. 13/858,514 entitled "Systems and Methods for Updating Panoramic Images" by Daniel Joseph Filip, filed Apr. 8, 2013.

Co-pending U.S. Appl. No. 13/662,124 entitled "Method, System, and Computer Program Product for Providing a Target User Interface for Capturing Panoramic Images" by Scott Ettinger, filed Oct. 26, 2012.

* cited by examiner

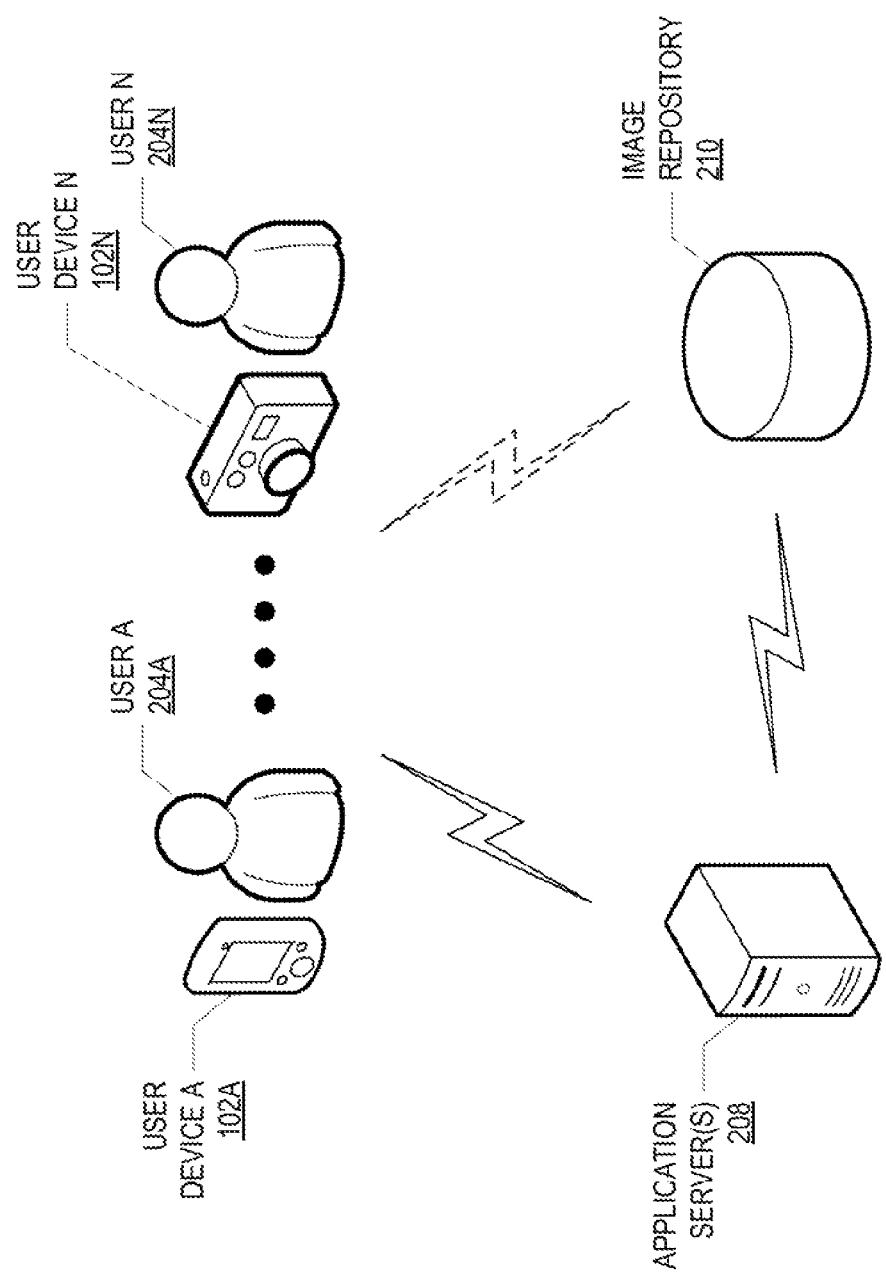

METHOD, SYSTEM, AND COMPUTER PROGRAM PRODUCT FOR GAMIFYING THE PROCESS OF OBTAINING PANORAMIC IMAGES

CROSS REFERENCE TO RELATED APPLICATIONS

The present application is a continuation of U.S. patent application Ser. No. 13/662,073, filed Oct. 26, 2012, the disclosure of which is incorporated herein by reference.

TECHNICAL FIELD

The present disclosure relates to a process for obtaining panoramic images. More specifically, embodiments of the present disclosure use an augmented video stream to encourage users to properly capture panoramic images using an image capture device.

BACKGROUND

Panoramic photography involves capturing images with enlarged fields of view.

Specialized hardware and/or software is typically used to capture individual images, which are then stitched together to form panoramic images. For example, a digital camera may be equipped with video capture capabilities such that when a user sweeps the camera through a field of view, individual images are continuously capture and then used to form a panoramic image. At this stage, the digital camera includes software to stitch the individual images together in order to create a panoramic image with a wider field of view. In this example, the quality of the panoramic image is affected by the velocity and steadiness of the digital camera as it is swept through the field of view. To improve the quality of panoramic images, digital cameras typically include functionality to indicate whether the digital camera is moving at an appropriate velocity.

Typical panoramic photography techniques are often time-consuming and tedious. Users may grow uninterested during a panoramic image capture, resulting in low quality images that are not suitable for stitching into a panoramic image. Or users may not be motivated enough to invest the amount of time required to learn and then properly execute a panoramic image capture.

SUMMARY

Various embodiments of systems, methods, and computer readable mediums for obtaining panoramic images are described herein. In some aspects, provided are a system, method, computer readable medium for generating a number of targets for a panoramic image, each of the targets defining a portion of the panoramic image, monitoring a position of a user device with respect to a current target, responsive to determining that the user device is properly positioned with respect to the current target, capturing a first image for the current target using a camera of the user device, monitoring the position of the user device with respect to a next target, responsive to determining that the user device is properly positioned with respect to the next target, capturing a second image for the next target using the camera of the user device; and generating the panoramic image using the first image and the second image.

In some aspects, the system, method, and computer readable medium are further for, responsive to determining that a targeting guide of the user device is within a threshold distance of the current target, displaying a high quality indicator at the current target. In some aspects, the system, method, and computer readable medium are further for displaying a low quality indicator at the current target while the targeting guide of the user device is outside the threshold distance.

In some aspects, the system, method, and computer readable medium are further for calculating a quality of the first image based on quality factors (e.g., velocity of the user device during the capture of the first image, exposure of the camera during the capture of the first image, rotational position of the user device during the capture of the first image, distance of a targeting guide of the user device from the first target during the capture of the first image, overlap of the first image with the second image) and determining whether the quality of the first image satisfies a quality threshold.

In some aspects, the system, method, and computer readable medium are further for, responsive to determining that the quality of the first image is below the quality threshold, discarding the first image and capturing a new image for the current target using the camera of the user device. In some aspects, the quality threshold is determined based on historical quality data of a user of the user device, the historical quality data being generated based on image quality of previously captured panoramic images.

In some aspects, the system, method, and computer readable medium are further for calculating a quality of the second image based on at least one of velocity of the user device during the capture of the second image, exposure of the camera during the capture of the second image, and rotational position of the user device during the capture of the second image and determining a quality of the panoramic image based on the quality of the first image and the quality of the second image.

BRIEF DESCRIPTION OF THE DRAWINGS

FIGS. 2 and 3A-3C show diagrams of systems in accordance with one or more embodiments.

Figure 1A:
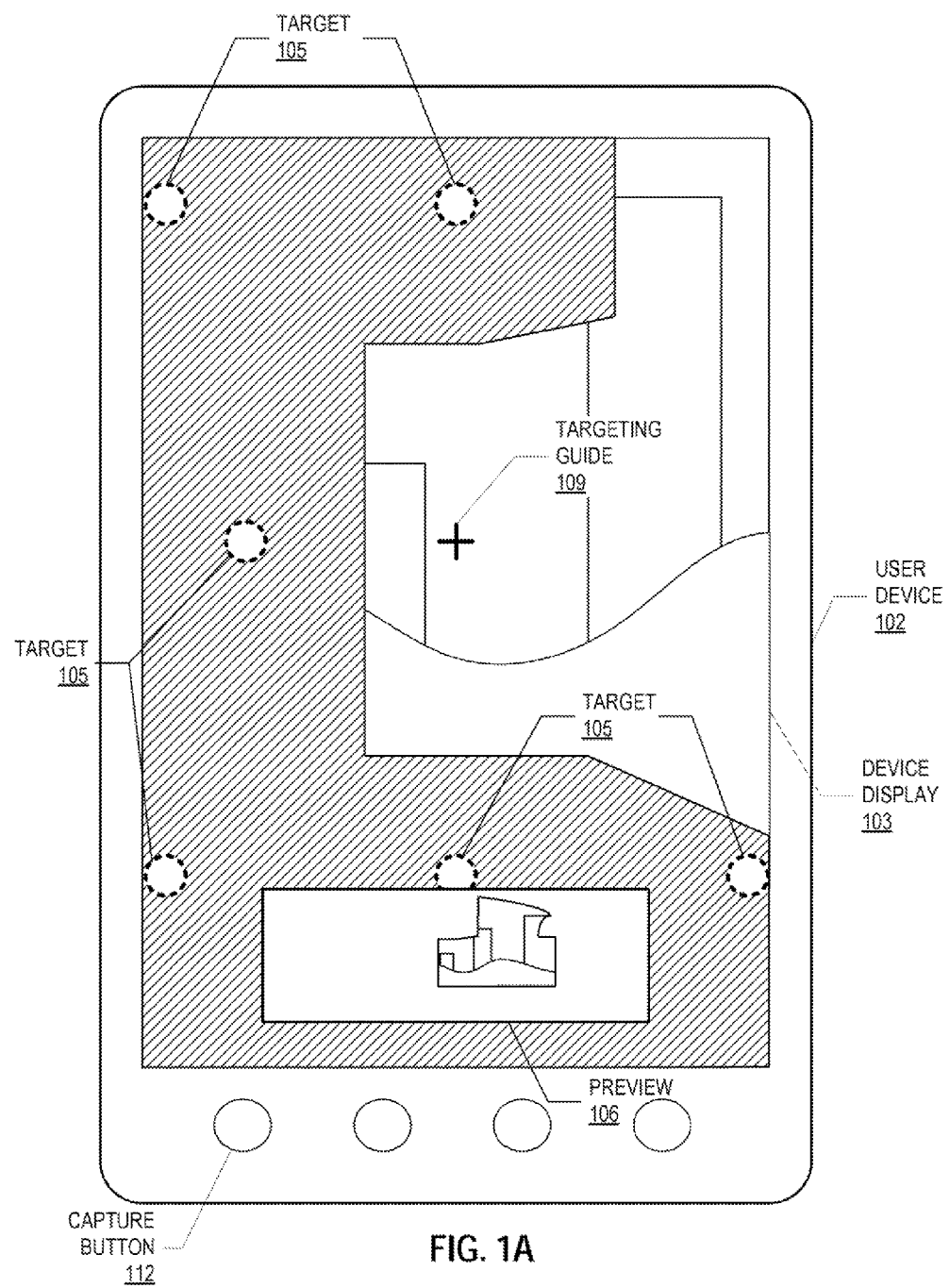
FIGS. 1A-1D show example user interfaces in accordance with one or more embodiments.

While obtaining panoramic images is susceptible to various modifications and alternative forms, specific embodiments thereof are shown by way of example in the drawings and will herein be described in detail. The drawings may not be to scale. It should be understood, however, that the drawings and detailed description thereto are not intended to limit obtaining panoramic images to the particular form disclosed, but to the contrary, the intention is to cover all modifications, equivalents, and alternatives falling within the spirit and scope of the present disclosure as defined by the appended claims.

DETAILED DESCRIPTION

As discussed in more detail below, provided in some embodiments are systems and methods for obtaining panoramic images using an augmented video stream. In one embodiment, the process for obtaining panoramic images using an augmented video stream includes the steps of generating a number of targets for a panoramic image, each of the targets defining a portion of the panoramic image, monitoring a position of the user device with respect to a current target, responsive to determining that the user device is properly positioned with respect to the current target, capturing a first image for the current target using a camera of the user device, monitoring the position of the user device with respect to a next target, responsive to determining that the user device is properly positioned with respect to the next target, capturing a second image for the next target using the camera of the user device; and generating the panoramic image using the first image and the second image.

A panoramic image is an image having an expanded field of view that exceeds the bounds of individual images that can be captured by a camera's lens. In some embodiments, the panoramic image is generated by stitching together overlapping images that in combination cover the expanded field of view. The overlapping images can be captured by, for example, an image capture device at intervals or a video capture device in a continuous stream as the camera is swept across the expanded field of view. The field of view of a panoramic image can be expanded both horizontally and vertically. For instance, a 360-degree panoramic image can be obtained by capturing overlapping images as a camera is completely rotated around a fixed point.

FIGS. 1A-1D show example interfaces in accordance with embodiments of obtaining panoramic images. More specifically, FIGS. 1A-1D show example user interfaces for performing panoramic image capture on a user device 102.

In FIG. 1A, the user device 102 includes a device display 103 displaying an augmented video stream provided by a camera, such as an image capture device disposed facing out, away from a rear face of the user device 102, which is into the page in the view of FIG. 1A. Examples of device display 103 technologies include multi-touch capacitive screens, organic light emitting diode (OLED) screens, etc. The augmented video stream may display targets 105, which are shown as dotted circles. The targets 105 are located at the center of overlapping, target images that once captured are to be combined in a panoramic image.

In this example, the user has already captured a target image near the current location of the targeting guide 109. The targeting guide 109 is located at the vertical and horizontal center of the device display 103 and is used by the user to redirect the camera of the user device 102 towards each of the targets 105. As target images are captured at each of the targets 105, a preview 106 shown at the bottom of the device display 103 is updated to include the captured target images. The preview 106 shows a panoramic image where each of the target images are projected into a flat image that accounts for the spherical angle of view used to capture the target images. Examples of images projections that may be used to generate the panoramic image include, but are not limited to, an equiretangular projection, a cylindrical projection, a rectilinear projection, a fisheye projection, a mercator projection, a sinusoidal projection, and a stereographic projection. The projection reduces distortion caused by the wider angle of view of the panoramic image.

The targets 105 may be captured by the user in any order. As target images are captured for each of the targets 105, additional targets may be dynamically added to further direct the user to redirect the camera of the user device 102. As the user repositions the user device 102, the targets 105 remains affixed to the field of view displayed in the device display 103. In other words, the representation of targets 105 in the device display 103 shifts with the field of view shown on the device display 103 as the user device is repositioned 102.

In some embodiments, the user device 102 includes a capture button 112 for initiating a panoramic image capture. In response to the user selecting the capture button 112, a camera application of the user device 102 may present the augmented video stream shown on display device 103 to initiate the panoramic image capture. The panoramic image capture may be completed when target images have been captured for all presented targets 105 or when the user selects the capture button 112 for a second time to stop the panoramic image capture. At this stage, the user device 102 may generate the panoramic image by stitching together the target images. In some embodiments, the target images are projected from a three-dimensional (3D) coordinate system to a two-dimensional (2D) perspective projection when generating the panoramic image similar to as discussed above with respect to the preview 106.

Figure 1B:
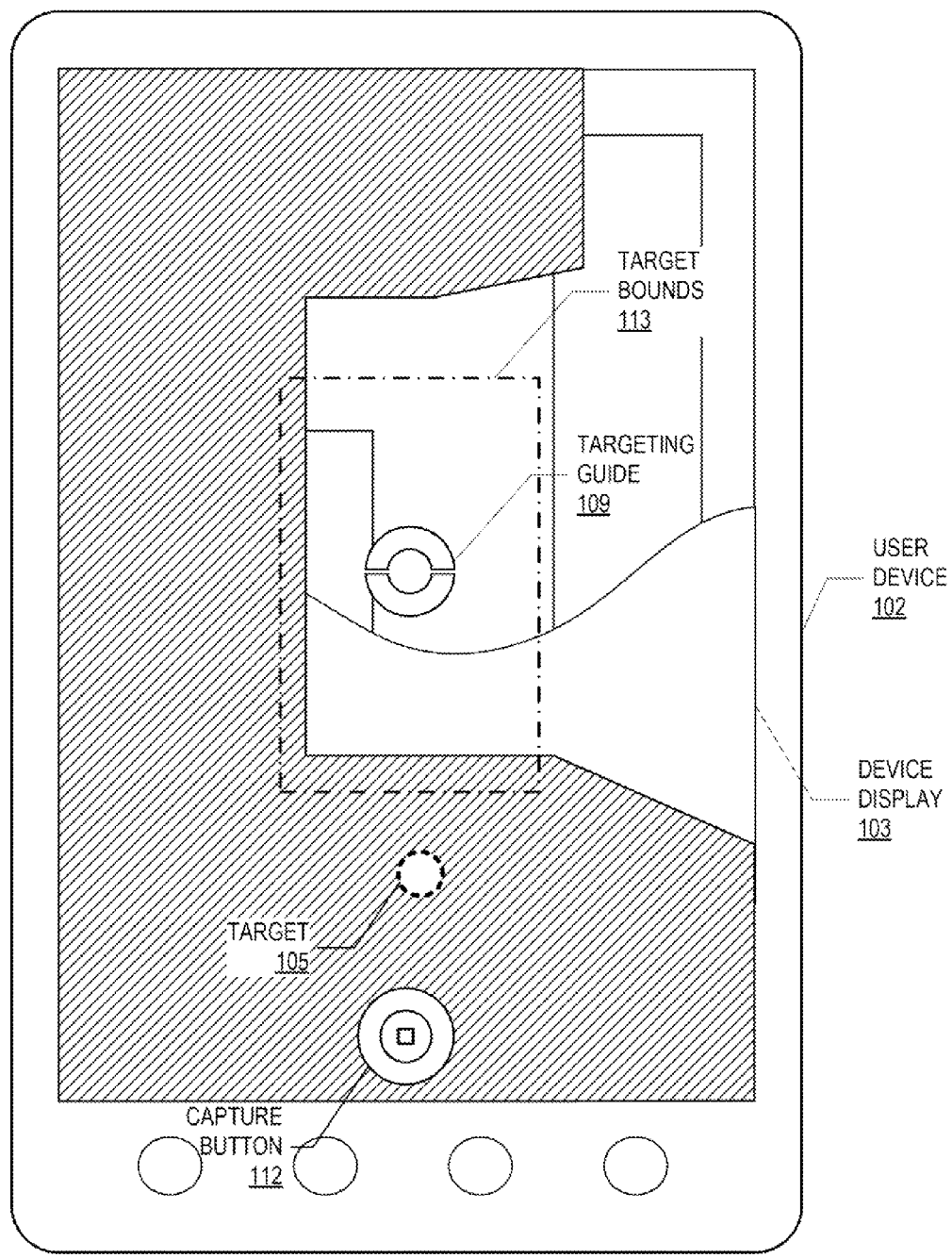

In FIG. 1B, the device display 103 is displaying an augmented video stream similar to the one shown in FIG. 1A except that a single target 105 is displayed and the preview of FIG. 1A is replaced with a soft capture button 112. The soft capture button 112 includes an indicator of the current state of the panoramic capture process. In this example, the indicator of the soft capture button 112 shows a square stop sign, which indicates that the user may halt the panoramic capture process by selecting the soft capture button 112.

FIG. 1B also differs from FIG. 1A in that the targeting guide 109 is presented as an incomplete circle in the center of which the target 105 should be placed in order to properly position the user device 102 for the next image capture of the panoramic capture process. In this example, the targeting guide 109 is also surrounded by target bounds 113 that show the extent of the images captured during the panoramic capture process.

Figure 1C:
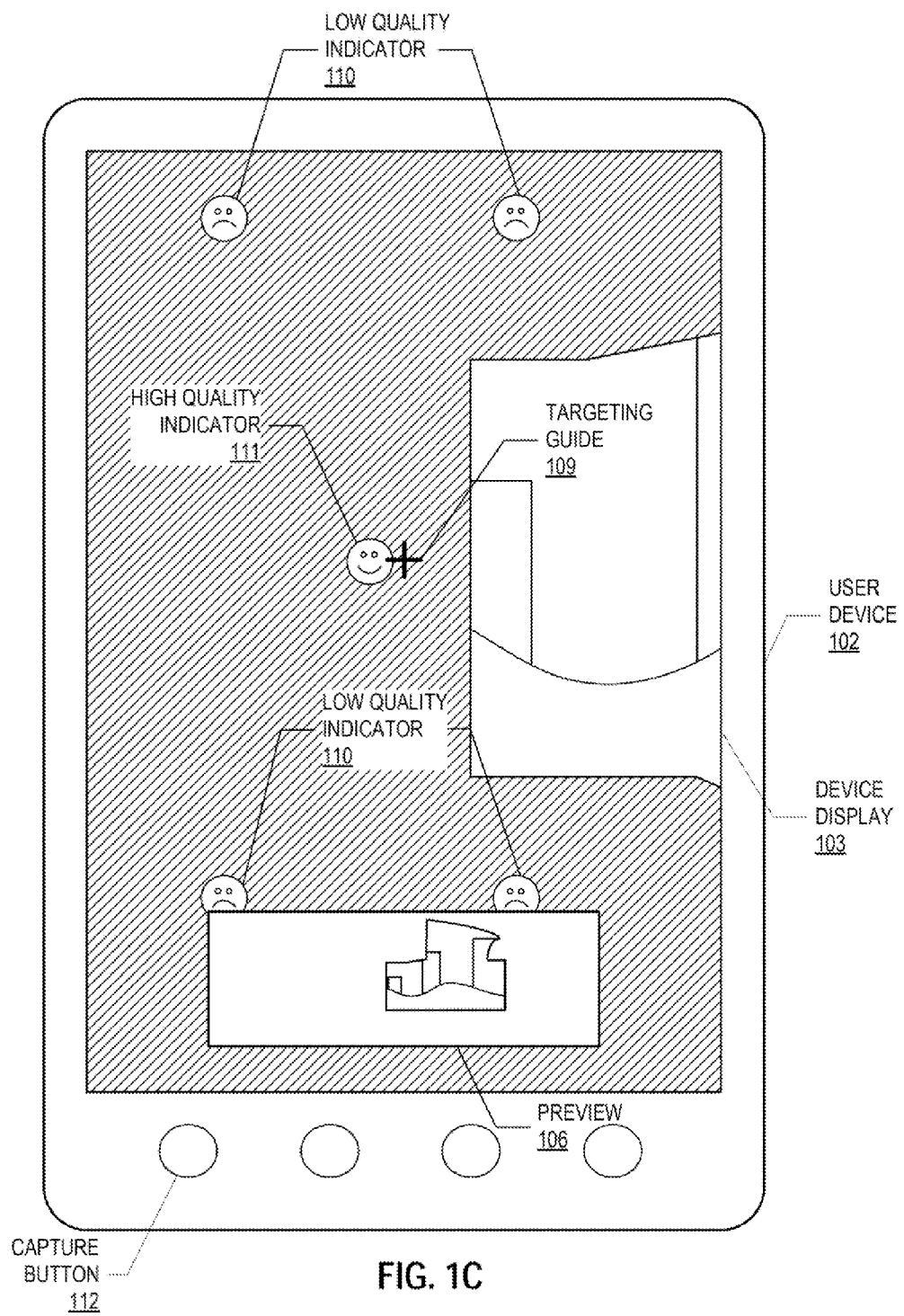

In FIG. 1C, the device display 103 is displaying an augmented video stream similar to the one shown in FIG. 1A except that the targets 105 of FIG. 1A are replaced with quality indicators (e.g., low quality indicators 110, high quality indicator 111). The quality indicators (e.g., low quality indicators 110, high quality indicator 111) notify the user of the quality of the positioning of the user device 102 with respect to each of the quality indicators. The high quality indicator 111 is a happy face, which indicates that the user device 102 is well positioned for capturing an image at the high quality indicator 111. The low quality indicator 110 are sad faces, which indicates that the user device 102 is not well positioned for capturing images at each of the low quality indicators 110.

In some embodiments, the quality of the positioning of the user device 102 may be determined based on the position of the targeting guide 109 with respect to the quality indicators (e.g., low quality indicators 110, high quality indicator 111). For example, a high quality position would be indicated if the targeting guide 109 is proximate to a quality indicator as shown for the high quality indicator 111 in FIG. 1C.

The low quality indicators 110 can continue to display sad faces until the targeting guide 109 is detected to be within a threshold distance of one of the low quality indicators 110. Once the targeting guide 109 is within the threshold distance, the low quality indicator 110 may change from a sad face to a happy face to indicate that the user device 102 is properly positioned to capture a target image at that location. Those skilled in the art will appreciate that other styles of quality indicators (e.g., low quality indicators 110, high quality indicator 111) may be used to indicate the quality of current positioning. For example, the quality indicators (e.g., low quality indicators 110, high quality indicator 111) may be rendered as a butterflies that begins flapping their wings when the user device 102 is properly positioned. In another example, the quality indicators (e.g., low quality indicators 110, high quality indicator 111) may be rendered as targets that are struck by bullets when the user device 102 is properly positioned.

Figure 1D:
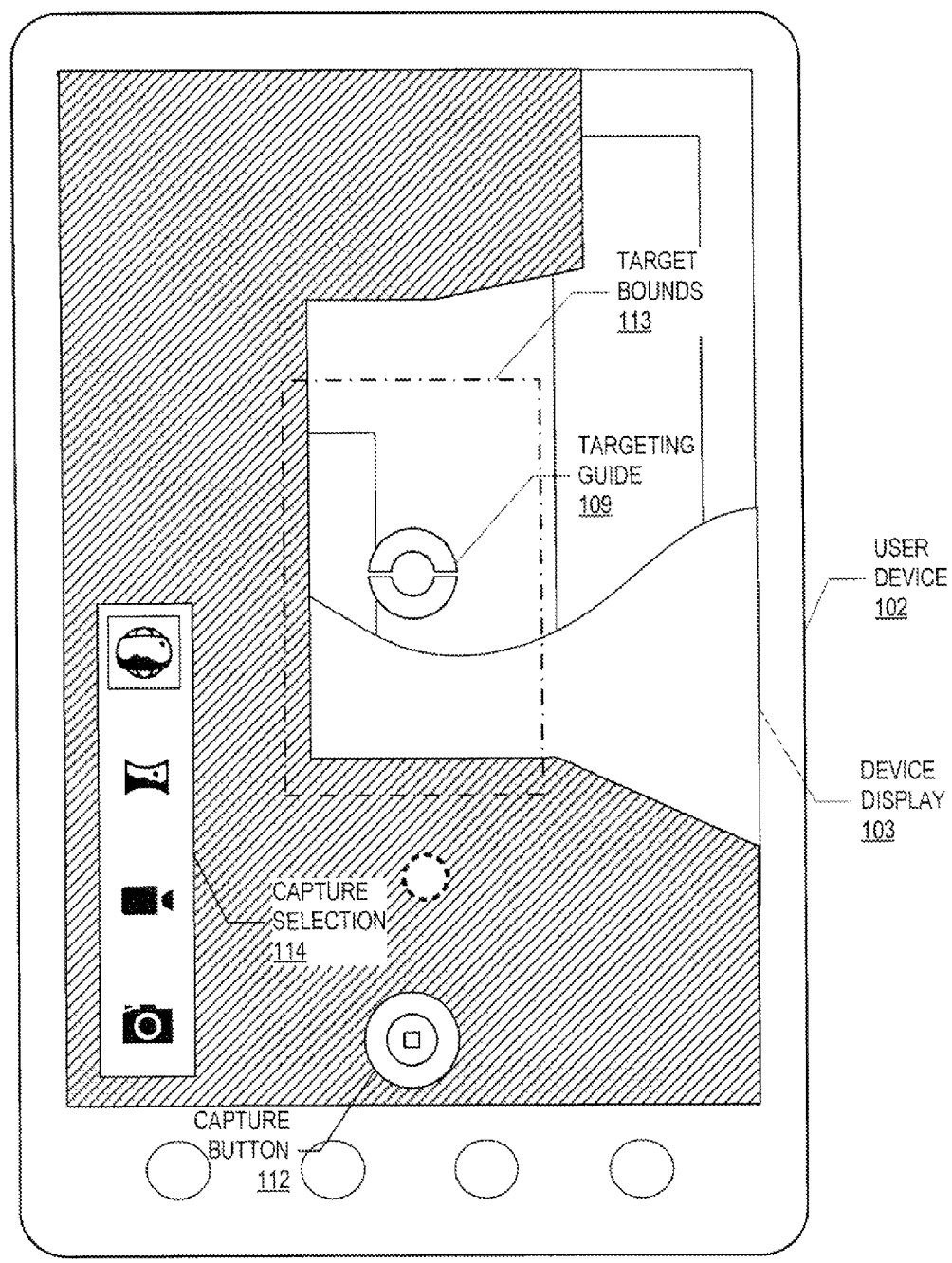

In FIG. 1D, the device display 103 is displaying an augmented video stream similar to the one shown in FIG. 1B except that it also includes a capture selection control 114. The capture selection control 114 allows the user to switch between different camera modes of the user device 103. In this example from top to bottom, the capture selection control 114 includes selections for (1) spherical panoramic capture; (2) panoramic capture; (3) video capture; and (4) image capture. FIG. 1D shows the spherical panoramic capture as being selected within the capture selection control 114.

Figure 3A:
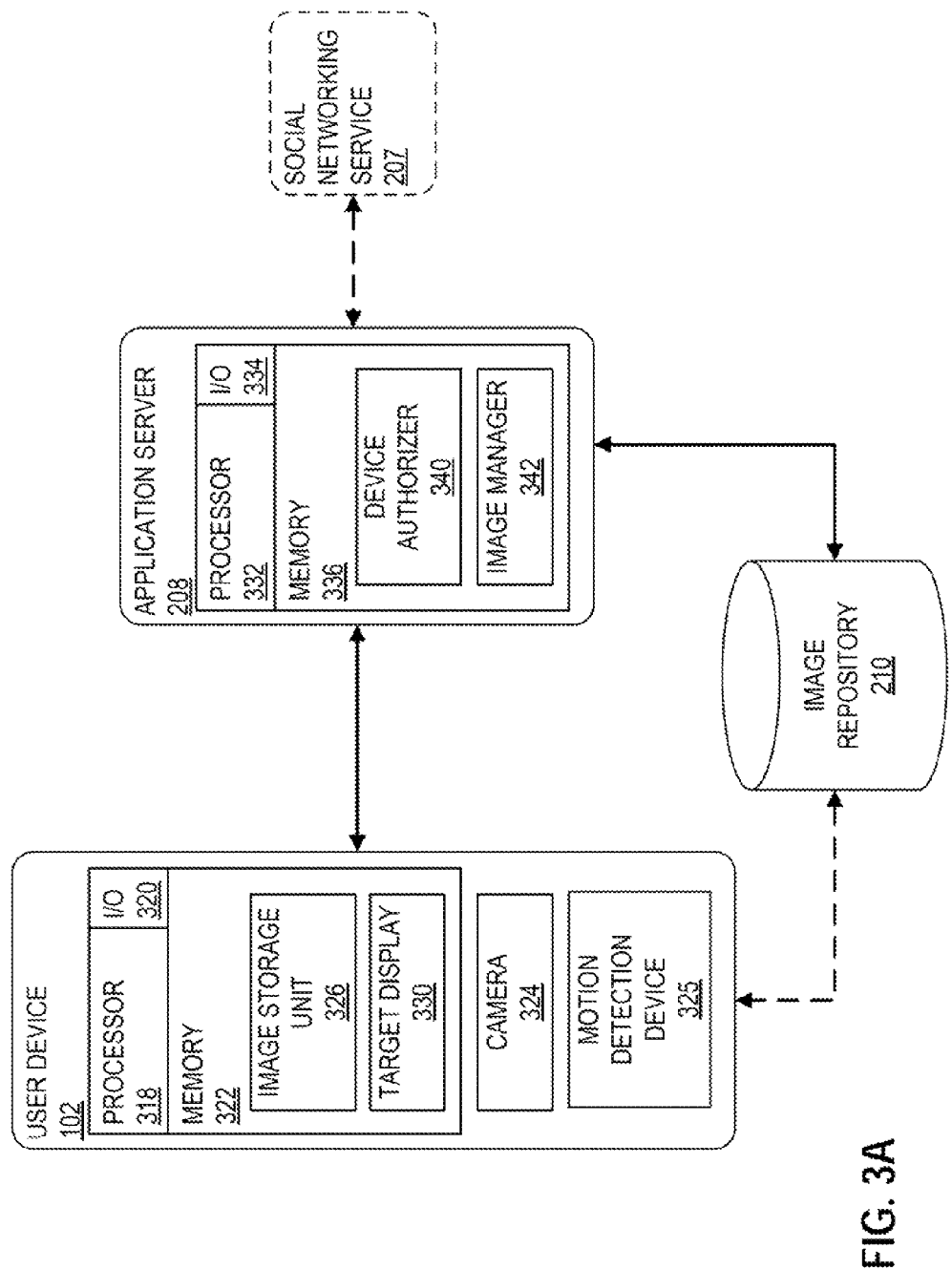
Figure 3B:
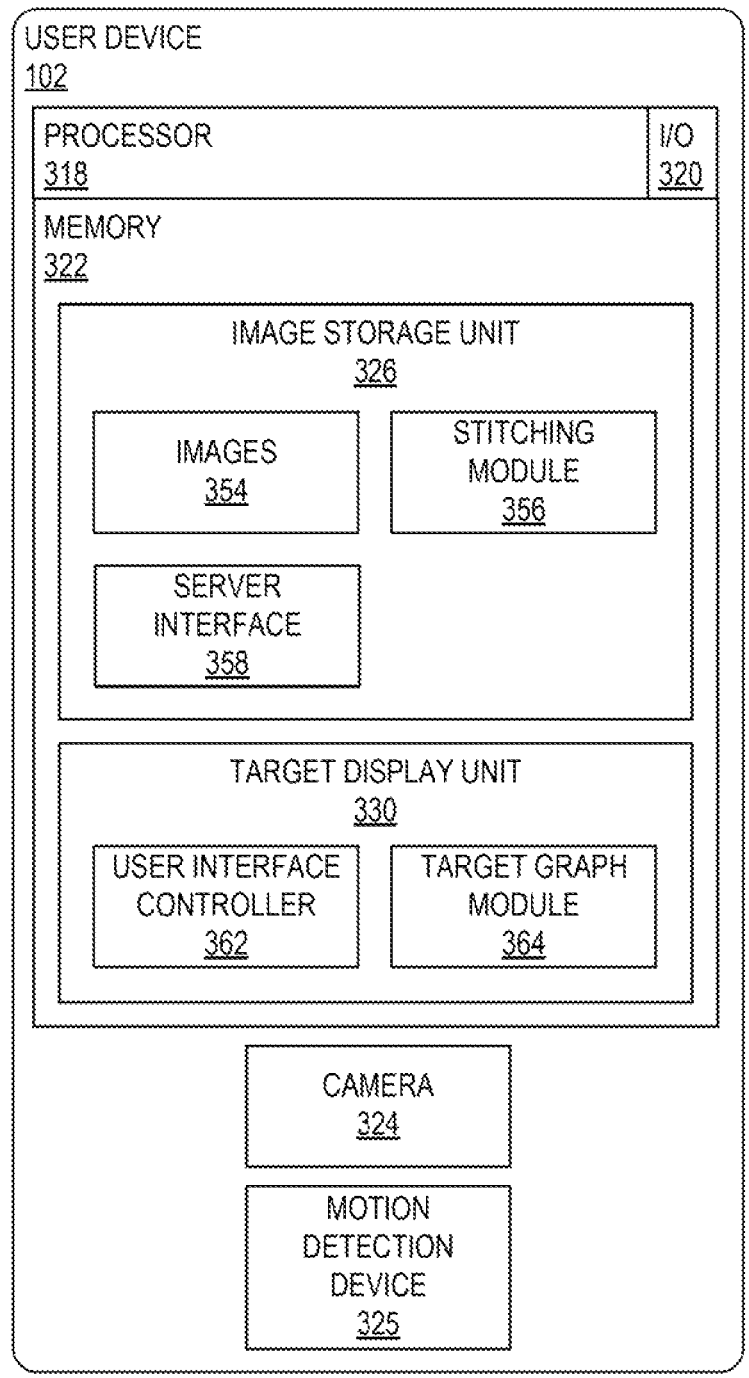
Figure 3C:
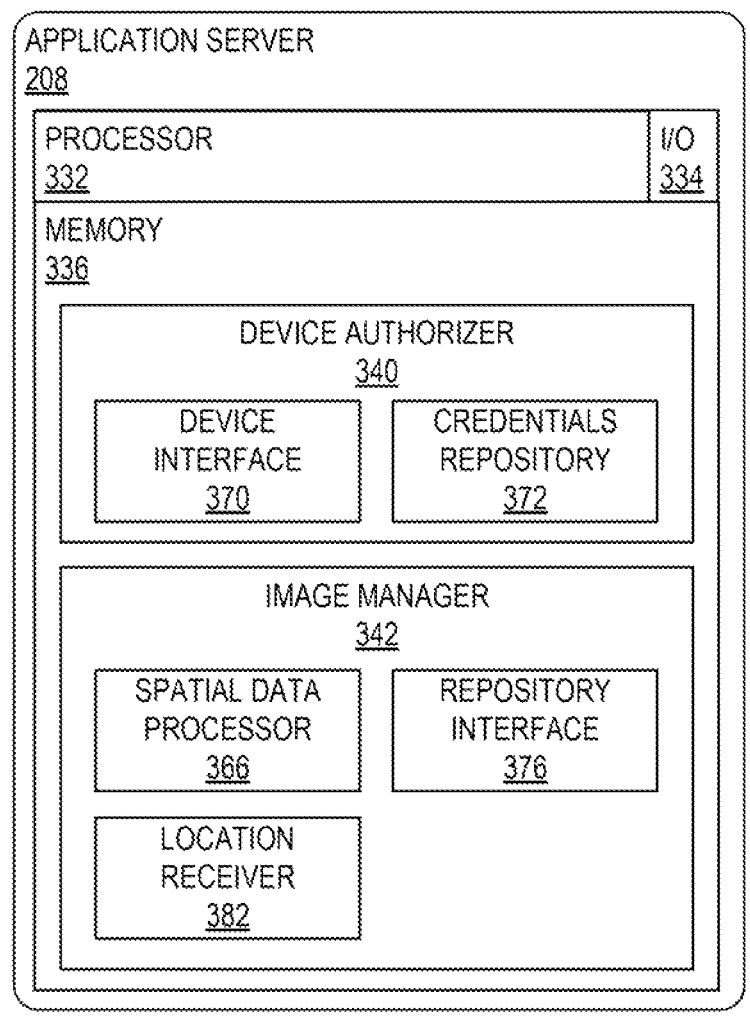

FIG. 2 shows a diagram of a system in accordance with one embodiment. The system of this embodiment includes user devices (e.g., user device A 102A and user device N 102N) interacting with application server(s) 208. Further, the illustrated application server 208 stores information in an image repository 210. FIGS. 3A-3C describe further aspects of the aforementioned components of FIG. 2.

Examples of user devices (e.g., user device A 102A, user device N 102N) include digital cameras, smartphones, tablet computers, laptop computers, augmented reality head-mounted display, etc. Each of the user devices (e.g., user device A 102A, user device N 102N) is equipped with a camera configured to capture images. Specifically, the user devices (e.g., user device A 102A, user device N 102N) may be configured to capture individual images that can be stitched together in order to create a panoramic image. As shown in FIG. 2, the user devices (e.g., user device A 102A, user device N 102N) in this example are operated by users (e.g., user A 204A, user N 204N).

In some embodiments, the application server(s) 208 may include an image service server and a map service server. Each of the application server(s) 208 may be may be implemented on multiple computing devices (i.e., servers), where a load balancing scheme distributes requests across the multiple computing devices. The image service server 208 may be substantially similar to the application server discussed below with respect to FIG. 3A-3C. The map service server 208 may be configured to provide spatial data (e.g., maps, geographic coordinates, directions, etc.) to the user devices (e.g., user device A 102A, user device N 102N). For example, the map service server 208 may provide a map displayed on user device A 102A, where user A 204A uses the map to locate a nearby point of interest. Alternatively or additionally, the map service server 208 may, in some embodiments, also provide images for the points of interest, such as images of a building, path, road, waterway, or other feature, which are viewed by the user A 204A on the user device A 102A. The map service server 208 may be configured to obtain images for maps from the image repository 210. In some embodiments, additional repositories at the same or different location as the image repository 210 may also be queried by the map service server 208 to generate maps of the points of interest or geographic areas for the user devices (e.g., user device A 102A, user device N 102N).

In some embodiments, the image service server 208 is configured to obtain and store images, where the stored images may be associated with the corresponding users (e.g., user A 204A, user N 204N) for use via the Internet (e.g., sharing on social networks, cloud storage, etc.). As images are received by the image service server 208 in some embodiments, the images are stored in the image repository 210, where the image service server 208 may associate the stored images with points of interests and geographic areas.

FIG. 3A shows a diagram of a system in accordance with some embodiments of obtaining panoramic images. The example system includes a user device 102 interacting with an application server 208. Further, the application server 208 of this embodiment stores information in an image repository 210 and interacts with a social networking service 207.

In some embodiments, the user device 102 is a mobile computing device. For example, the user device 102 may be a digital camera, a laptop computer, a smartphone, a tablet computer, a wirelessly-networked imaging device, an augmented reality head-mounted display, or other image capture device configured to be readily transported with a user over a distance. In some embodiments, the user device 102 includes a camera 324 configured to capture images, such as in a video format or as still images, including stereoscopic video or still images. For instance, the camera 324 may include one or more image sensors configured to capture images of light within the visible spectrum for use by the user device 102.

In some embodiments, the user device 102 includes a processor 318, an input/output module 320, and a memory 322. The user device 102 may be implemented as a computing device with an operating system, stored in the memory 322, for interacting with a user. For example, the operating system may be configured to provide applications (e.g., camera application, map application, social networking application, etc.) to the user. In some embodiments, the memory 322 includes an image storage unit 326 and a target display unit 330.

In some embodiments, the image storage unit 326 of the user device 102 is configured to manage the images captured by the camera 324. For example, the image storage unit 326 may be configured to (1) store images 354 of FIG. 3B captured by the camera 324 and/or (2) transmit the stored images 354 of FIG. 3B to the application server 208. In some embodiments, the stored images 354 of FIG. 3B may be stored on a local, tangible storage medium (e.g., random access memory, flash memory, etc.) of the user device 102.

In some embodiments, the image storage unit 326 may further include a stitching module 356 of FIG. 3B that is configured to stitch images together by (1) matching objects (i.e., overlapping the same object in neighboring images) across images; (2) calibrating the images to minimize differences between the images (e.g., optical defects, exposure differences, image capture device parameters when the image was captured, etc.); and (3) blending the images based on the calibration (e.g., adjusting colors for exposure differences, motion compensation, etc.).

In some embodiments, the stitching module 356 of FIG. 3B is configured to improve the image stitching process by using location information associated with the images. For example, the stitching module 356 of FIG. 3B may be configured to use the location information of the images to account for different perspective points of each of the images when identifying matching objects in the images. In this example, the location information may be obtained from a positioning device such the Global Positioning System or from a motion detection device 325 of the user device 102 as discussed below.

The image storage unit 326 may associate operating parameters of the camera 324 with the image, e.g., the time at which the image was captured and data indicative of the quality of the image such as the velocity of the user device 102 during image capture. In some embodiments, camera settings and attributes of the user device at the time the image was captured may also be associated with the image by the image storage unit 326 such as resolution, exposure time, aperture, depth of focus, and post processing settings (e.g., white balance, compressing settings, sharpness adjustments). For instance, the user device 102 may include a motion detection device 325 (e.g., an accelerometer such as a 3-axis accelerometer or a 6-axis accelerometer), and based on signals from the motion detection device 325, aspects of the positioning of the user device 102, such as the altitude and orientation between a portrait or landscape view (e.g., angular position of the image sensor about a horizontal axis) of the user device 102, may be associated with the image by the image storage unit 326. The motion detection device 325 may also include a magnetometer or other sensor configured to determine the azimuth of the user device 102 at the time the image is captured. In this case, the azimuth may also be associated with the image by the image storage device.

In some embodiments, the image storage unit 326 may include a server interface 358 of FIG. 3B that is configured to provide images and associated data to the application server 208. For example, the server interface 358 of FIG. 3B may provide panoramic images to the application server 208 along with a request to store the panoramic images in cloud storage or to share the panoramic images on a social network. In some embodiments, the request may also include quality data (e.g., coverage of panoramic image, proper overlap between images during stitching, clarity of image, etc.) associated with the panoramic images. For example, the server interface 358 of FIG. 3B may be configured to provide a panoramic image and a calculated quality of the image to the application 208 for sharing on a social network services, where the user of the user device 102 earns points or achievements based on the quality of the panoramic image.

In some embodiments, the target display unit 330 includes a user interface controller 362 of FIG. 3B configured to display guidance for capturing a panoramic image on a display screen (not shown) of the user device 102. For example, the user interface controller 362 of FIG. 3B may superimpose a targeting guide and targets in a video stream obtained from the camera 324 in order to encourage the user to properly reposition the user device 102. In this example, the operating parameters of the camera 324 may be analyzed by the user interface controller 362 of FIG. 3B to place targets in the video stream where the user should capture images, which can then be stitched into a panoramic image by the stitching module 356 of FIG. 3B. Further, the user interface controller 362 of FIG. 3B may also be configured to monitor the position and orientation (obtained from, for example, accelerometers) of the camera 324 to track the movement of the user in order to update the superimposed user interface elements as the user device 102 is repositioned. In some embodiments, the user interface elements superimposed by the user interface controller 362 of FIG. 3B may be as discussed above with respect to FIGS. 1A-1D.

In some embodiments, the user interface controller 362 of FIG. 3B of the target display unit 330 is further configured to display confirmation of each successful image capture on the display screen of the user device 102. For example, the user interface controller 362 of FIG. 3B may notify the user as each image is properly captured during a panoramic image capture and update a preview of the panoramic image showing a panoramic including the currently captured images. In this example, the user interface controller 362 of FIG. 3B may also be configured to display the completed panoramic image for review by the user after all the images have been captured. In some embodiments, the user interface controller 362 of FIG. 3B may also be configured to display quality indicators at the targets, where the quality indicators notify the user as to whether the user device 102 is properly positioned to capture an image at each of this targets. In this example, the quality of each of the individual images may be calculated based on how closely centered and properly aligned the targeting guide is with respect to the corresponding image target (e.g., targets or quality indicators as discussed above with respect to FIGS. 1A-1D) when the individual images are captured.

In some embodiments, the user interface controller 362 of FIG. 3B may also be configured to track the quality of panoramic images captured by the camera 324 as historical quality data. The historical quality data may be used to adjust a quality threshold for the individual images captured by the camera 324, where the quality threshold specifies the minimum quality that should be achieved before an individual image can be included in a panoramic image. In some embodiments, the historical quality data allows the quality threshold to be adjusted based on the image capturing capabilities of the user. For example, an experienced user that consistently captures high quality images may have a higher quality threshold whereas a novice user that captures images of inconsistent quality may have a lower quality threshold.

In some embodiments, the target display unit 330 further includes a target graph module 364 of FIG. 3B configured to generate an image target graph that defines the bounds of the images to be captured in order to generate a panoramic image. For example, when a panoramic image capture is initiated by the user, the target graph module 364 of FIG. 3B may generate an image target graph based on the current orientation and the angle of view of the camera 324. In this example, the image target grid may be used by the user interface controller 362 of FIG. 3B to place superimposed user interface elements as discussed above on the video stream of the camera 324 during a panoramic image capture.

In some embodiments, the application server 208 is a computing device configured to provide application services (e.g., image services, map services, etc.) to a number of client devices such as the user device 102. In some embodiments, the application server 208 includes a processor 332, an input/output module 334, and a memory 336. The application server 208 may include various types of computing devices that execute an operating system. The processor 332 may execute instructions, including instructions stored in the memory 336. The instructions, like the other instructions executed by computing devices herein, may be stored on a non-transitory computer readable medium such as an optical disk (e.g., compact disc, digital versatile disk, etc.), a flash drive, a hard drive, or any other computer readable storage device. The input/output module 334 of the application server 208 may include an input module, such as a radio frequency sensor, a keyboard, and/or a mouse, and an output module, such as a radio frequency transmitter, a printer, and/or a monitor. The application server 208 may be connected to a local area network (LAN) or a wide area network (e.g., the Internet) via a network interface connection. In some embodiments, the input/output module 334 may take other forms.

In some embodiments, the memory 336 includes a device authorizer 340 and an image manager 342. The aforementioned components of the application server 208 may be implemented on multiple computing devices (i.e., servers), where a load balancing scheme distributes requests across the multiple computing devices.

In some embodiments, the device authorizer module 340 of the application server 208 is configured to manage user sessions for user devices 204. For example, the device authorizer module 340 of this embodiment includes a device interface 370 of FIG. 3C configured to authenticate credentials from the user device 102 when initiating a user session. In this example, the user device 102 is not authorized to interact with the application server 208 until the credentials are confirmed to be valid by the device interface 370 of FIG. 3C. In some embodiments, the device authorizer 340 also includes a credentials repository 372 of FIG. 3C configured to store encrypted credentials used to authorize the users of the application server 208.

In some embodiments, the device interface 370 of FIG. 3C of the device authorizer module 340 may also be configured to interact with a social networking service 207 on behalf of the user device 102. In this case, the device interface 370 of FIG. 3C is configured to request authorization to access the social networking service 207 from the user device 102. Once authorized, the device interface 370 of FIG. 3C may interact with the social networking service 207 to post images provided by the user device 102 and provide social rewards in response to those images to the user.

In some embodiments, the image manager module 342 of the application server 208 is configured to manage images received from user devices 102. Specifically, the image manager module 342 may include: (1) a spatial data processor 366 of FIG. 3C configured to associate the images with geographic locations; (2) a repository interface 376 of FIG. 3C configured to store and manage images in the image repository 210; and (3) a location receiver 382 of FIG. 3C configured to process location information received from user devices 102.

In some embodiments, the location receiver 382 of FIG. 3C of the image manager module 342 may be configured to manage location information received from user devices 102. The location receiver 382 of FIG. 3C may be configured to receive location information from the user device 102, where the location information is associated with corresponding images provided by user device 102. In this case, the location receiver 382 of FIG. 3C may be configured to anonymize the location information before it is stored to protect the identity of the user. For example, personal data identifying the user is stripped from the location information before the location information is stored in the memory 336. Further, the location information may only be obtained from the user device 102 if the user elects to participate in image collection for the application server 208.

In some embodiments, the spatial data processor 366 of FIG. 3C may be configured to associate images provided by user devices 102 with geographic locations. For example, the images provided by the user devices 102 may include embedded location information such as geographic coordinates. In this example, the spatial data processor 366 of FIG. 3C may associate the images with their corresponding geographic locations in a spatial database. The spatial database may then be used to provide images that are included in maps of the geographic locations.

In some embodiments, the repository interface 376 of FIG. 3C is configured to store images in the image repository 210. For example, the repository interface 376 of FIG. 3C may store the images in the image repository 210 in order to provide a cloud storage service. In this example, the repository interface 376 of FIG. 3C may also be configured to retrieve and provide the images to the user device 102 for the user. In another example, the stored images may be related to location information (i.e., geographic coordinates), allowing a map service to use the stored images as spatial data for generating maps. The image repository 210 may correspond to a server, a database, files, a memory cache, etc. that is stored locally (e.g., located on the application server) or shared on a network (e.g., a database server). The user device 102 may interact directly with the image repository 210 to directly store captured images. In some embodiments, metadata associated with the stored images is stored in a separate repository (not shown). For example, the image repository 210 and the separate repository may be organized in a distributed relational database architecture.

In some embodiments, the image repository 210, or a related repository, is configured to store information related to the stored images. For example, the image repository 210 may also store results of analysis (e.g., object recognition, etc.) performed on the stored images. In another example, the image repository 210 may also store metadata (e.g., geographic location of image, timestamp of image, format of image, etc.) related to the stored images.

Figure 4:
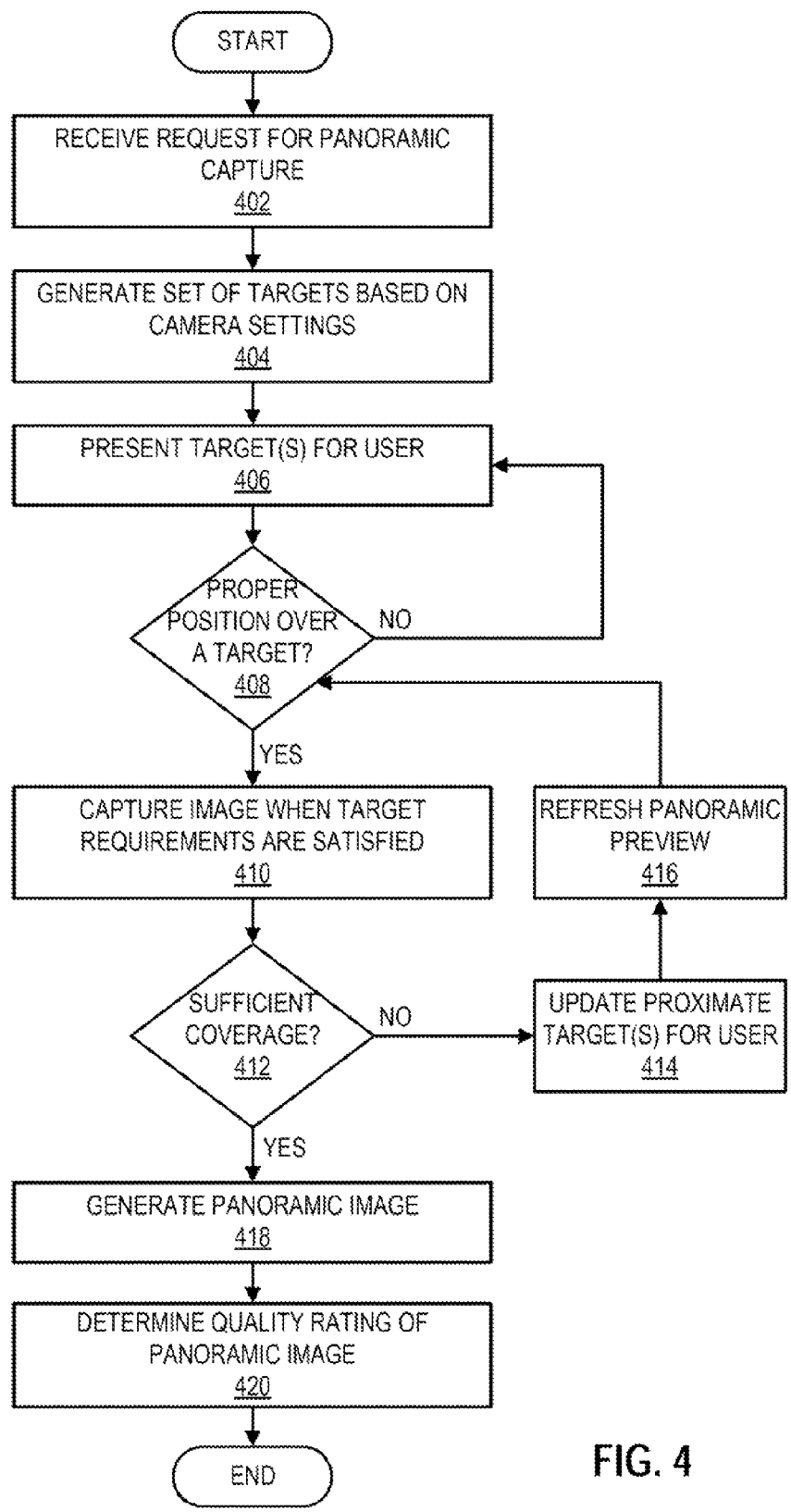
FIG. 4 shows a flow chart in accordance with one or more embodiments.

FIG. 4 shows a flow chart in accordance with certain embodiments. More specifically, FIG. 4 is a flow chart of a method performed by a user device to obtain a panoramic image. As is the case with the other processes described herein, various embodiments may not include all of the steps described below, may include additional steps, and may sequence the steps differently. Accordingly, the specific arrangement of steps shown in FIG. 4 should not be construed as limiting the scope of obtaining images to enhance imagery coverage.

In step 402 of this embodiment, a request for a panoramic image capture is received by the user device. The request may be initiated by a user selecting a panoramic command (e.g., button on a touch screen interface, manual button on a digital camera, etc.) on the user interface of the user device. In some embodiments, the request from the user includes operating parameters such as an orientation and angle of view of a camera of the user device. The request from the user may also include a stitching overlap threshold, which specifies an amount of overlap that should occur between neighboring individual images. In some embodiments, the stitching overlap threshold may have a default value that is configurable by the user.

In step 404 of this embodiment, a set of targets are generated based on the operating parameters of the camera. The set of targets may be generated as an image target graph that includes image targets for obtaining overlapping images sufficient to build a 360 degree panoramic view at the current point of view of the user. For example, based on the angle of view and orientation of the camera, the image target graph is generated with a number of image targets represented as target nodes, where neighboring target nodes are connected by proximate edges. In this example, both the vertical and horizontal angle of view of the camera may be accounted for when determining the image targets of the image target graph. Further, as the stitching overlap threshold decreases, the number of individual images required for a complete 360 degree panoramic view increases. An example image target graph for a wide lens camera in a landscape orientation is discussed below with respect to FIG. 5.

Figure 5:
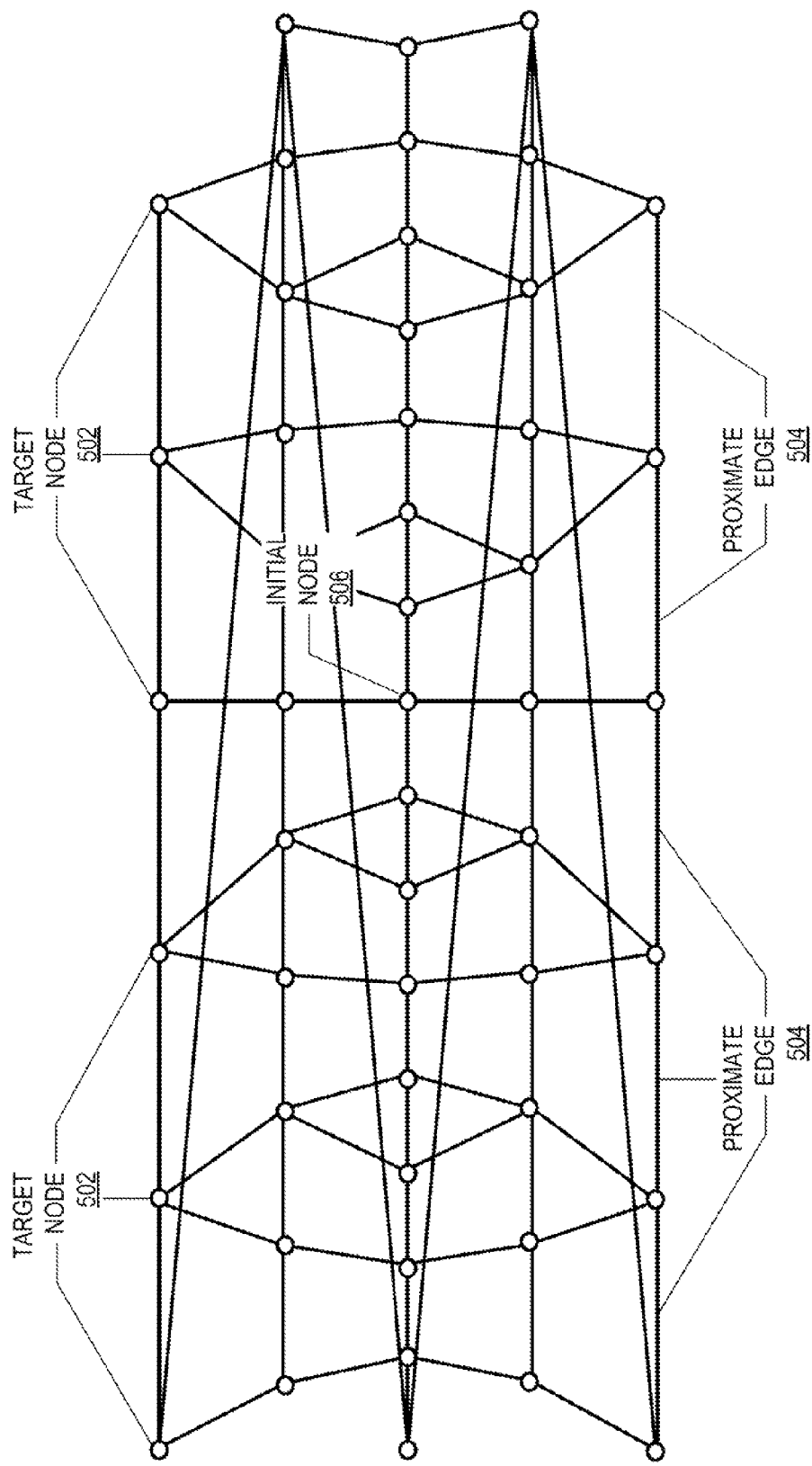
FIG. 5 shows an example image target graph in accordance with one or more embodiments.

In some embodiments, an image target graph such as the one shown in FIG. 5 is generated by selecting image targets according to the vertical and horizontal angle of view of the camera. In this case, the image targets within the image target graph are positioned such that each image capture at an image target overlaps, both vertically and horizontally, any neighboring images captured by the overlap threshold. Further, the selection of image targets for the image target graph vary depending upon the operating parameters of the camera. Generally, a camera with a wider angle of view has fewer image targets within its image target graph because each captured image covers a larger proportion of a full 360 panorama. Conversely, a camera with a narrower angle of view has more image targets within its image target graph because each captured image covers a smaller proportion of a full 360 panorama. The image targets selected are also similarly affected by the overlap threshold. Specifically, as the overlap threshold increases the number of image targets within the image target graph increases and vice versa.

In step 406 of this embodiment, target(s) are presented on the display of the user device. Initially, the target may correspond to an initial target node at the center of the image target graph. In this case, the user may be encouraged to position a targeting guide displayed on the user device over the initial target. For example, the initial target may flash or otherwise notify the user that it is the current target for the panoramic image capture.

In step 408 of this embodiment, a determination is made as to whether the user device is properly positioned. The user device may be determined to be properly positioned when the targeting guide is centered over and aligned with one of the target(s). If the user device is not properly positioned, the process returns to step 406.

Once the user device is properly positioned, an image is captured in step 410. The user device may be determined to be properly positioned when target requirements for a target of the panoramic image capture are satisfied. For example, the target requirements may correspond to image quality factors (e.g., velocity of user device, distance that the targeting guide is from the image target, etc.) that should be satisfied before an image is captured at the target. In this example, thresholds for the image quality factors can be configured by the user to, for example, be consistent with the proficiency level of the user (i.e., a more experienced users may specify higher thresholds for the image quality factors).

In step 412 of this embodiment, a determination is made as to whether there is sufficient coverage for the panoramic image. Sufficient coverage for the panoramic image may be, for example, sufficient images to generate a complete 360 panoramic image at the current position of the user. In other embodiments, it may be determined that there is sufficient coverage for the panoramic image in response to a request from the user to stop the panoramic image capture.

If the current coverage of the images is not sufficient to generate the panoramic image, the proximate targets of the last target captured may be updated for the user in step 414. The proximate targets may be determined according to the image target graph generated in step 404. For example, if the last target captured is the initial target, the device display may be updated to also display the proximate targets that are neighboring the initial target node in the image target graph. Similarly, as each of the images of the panoramic is captured in step 410, the device display is updated to also display the proximate targets of the last target captured.

In step 416 of this embodiment, a panoramic preview may be refreshed to include the image captured in step 410. As each of the individual images of the panoramic is captured in step 410, the panoramic preview may be updated with the latest captured image. The panoramic preview allows the user to view the overall progress of the panoramic image as the user device is repositioned to obtain each of the individual images. After the proximate targets and panoramic preview are updated, the method may return to step 408 to determine whether to capture the next image in a similar manner as discussed above with respect to steps 410-416. In some embodiments when multiple targets are displayed on the display of the user device, the user may be allowed to capture images for the targets in any order.

If it is determined that there is sufficient coverage for the panoramic image, the panoramic may be generated in step 418 of this embodiment. The panoramic image may be stitched together from the individual images captured in step 410. In some embodiments, the image targets used to capture the individual images may also be used to generate the panoramic image. In this case, the image targets may be used to properly place and stitch the individual images together to form the panoramic image.

In step 420 of this embodiment, a quality rating of the panoramic image is determined. The quality rating of the panoramic image describes an overall quality of the panoramic image based on, for example, the quality factors of the individual images discussed above in step 410. In this example, other quality information related to the panoramic image may also be used to determine the quality rating such as dynamic range, contrast, sharpness, and color accuracy of the generated panoramic image.

FIG. 5 shows an example image target graph in accordance with embodiments of obtaining panoramic images. More specifically, FIG. 5 shows an example image target graph for a user device with a camera operating in landscape mode.

In FIG. 5, the image target graph includes target nodes 502 and proximate edges 504, which connect neighboring target nodes 502. Each of the target nodes 502 represents an image target for generating a panoramic image. In this example, the image targets are positioned such that if images are captured at each of the image targets, the images can be stitched together to generate a full 360 degree panoramic image.

An initial node 506 is shown at the center of the image target graph. After a panoramic image capture is initiated, an initial target corresponding to the initial node 506 may be displayed on a user device as discussed above with respect to FIG. 4. In response to an image being captured at the initial target, the display of the user device may be updated to include targets corresponding to the target nodes 502 that are connected to the initial node 506 via proximate edges 504. As additional images are captured for the newly included image targets, the display of the user device may be updated to further include additional targets for target nodes 502 connected by proximate edges 504.

Figure 6:
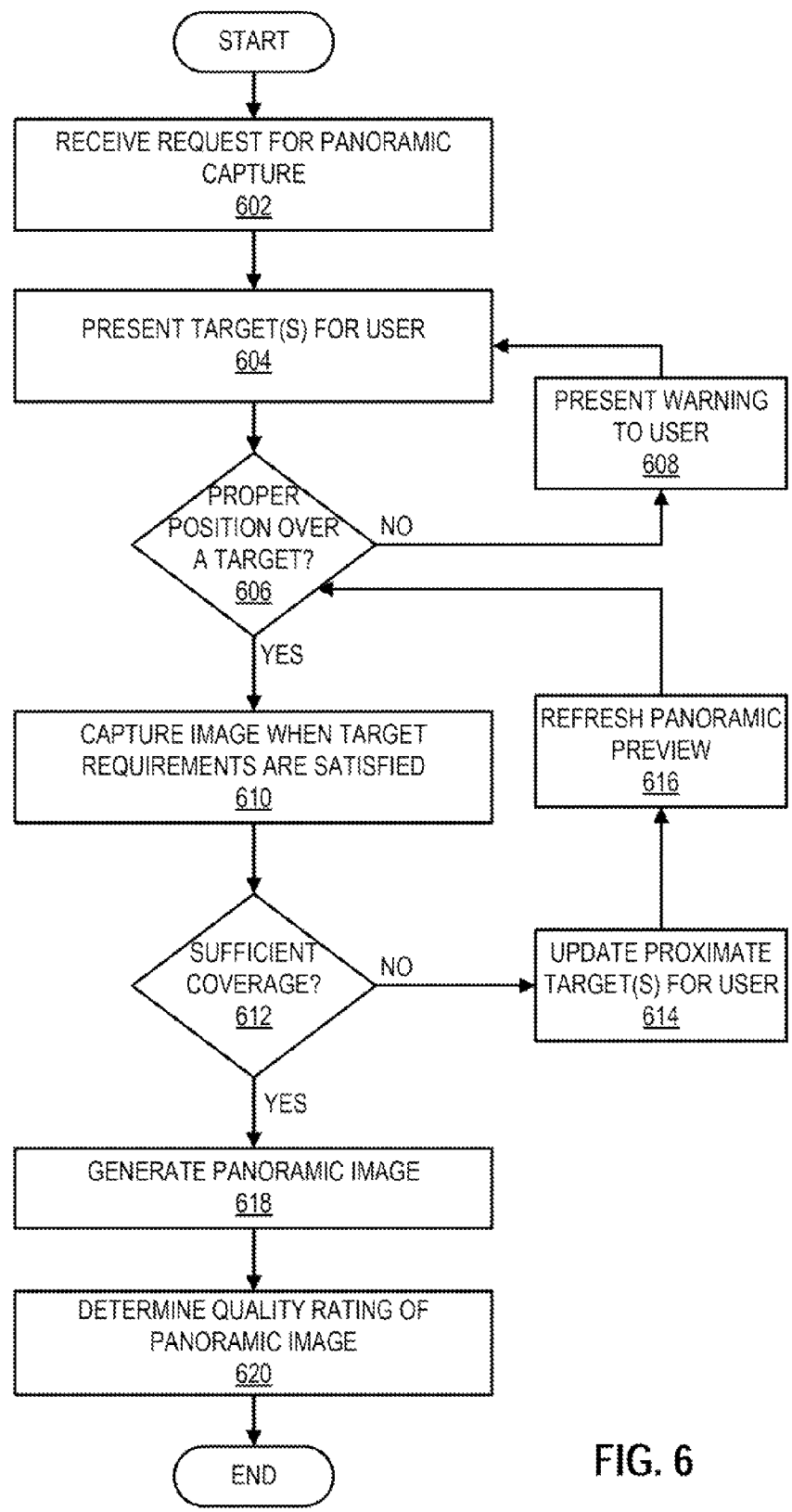
FIG. 6 shows a flow chart in accordance with one or more embodiments.

FIG. 6 shows a flow chart in accordance with certain embodiments. More specifically, FIG. 6 is a flow chart of a method performed by a user device to obtain a panoramic image. As is the case with the other processes described herein, various embodiments may not include all of the steps described below, may include additional steps, and may sequence the steps differently. Accordingly, the specific arrangement of steps shown in FIG. 6 should not be construed as limiting the scope of obtaining images to enhance imagery coverage.

In step 602 of this embodiment, a request for a panoramic image capture is received by the user device. The request may be initiated by a user selecting a panoramic command (e.g., button on a touch screen interface, manual button on a digital camera, etc.) on the user interface of the user device. In some embodiments, the request from the user includes operating parameters such as an image quality threshold and a target size of the panoramic image. The image quality threshold may specify the minimum quality required for each of the individual images that are to be used to generate the panoramic image.

In step 604 of this embodiment, an image target is presented on the display of the user device. The image target may be a quality indicator that also provides an indication of whether the user device is properly positioned. A targeting guide may also be presented on the display of the user device, where the user is encouraged to position the targeting guide over the image target. For example, the image target may be presented as a cartoon face that is sad when the user device is improperly positioned and is happy when the user device is properly positioned.

In step 606 of this embodiment, a determination is made as to whether the user device is properly positioned. The user device may be determined to be properly positioned when the targeting guide is centered over and aligned with the image target. If the user device is not properly positioned, a warning that the user device is not properly positioned is presented to the user in step 608. For example, if the targeting guide is a quality indicator, the warning of improper position may be presented as a sad face. In some embodiments, the presentation of the quality indicator may be correspondingly updated as the user device is repositioned. In this example, the presentation of the face may correspond to the distance the targeting guide is from the image target (e.g., the face may change from being sad to neutral to happy as the targeting guide moves closer to the image target).

Once the user device is properly positioned, an image is captured in step 610. The user device may be determined to be properly positioned when target requirements for the panoramic image capture are satisfied. For example, the target requirements may correspond to image quality factors (e.g., velocity of user device, distance that the targeting guide is from the image target, etc.) that should be satisfied before an image is captured. In this example, thresholds for the image quality factors can be configured by the user to, for example, be consistent with the proficiency level of the user (i.e., a more experienced users may specify higher thresholds for the image quality factors).

In step 612 of this embodiment, a determination is made as to whether there is sufficient coverage for the panoramic image. Sufficient coverage for the panoramic image may be, for example, sufficient images to generate a complete 360 panoramic image at the current position of the user. In other embodiments, it may be determined that there is sufficient coverage for the panoramic image in response to a request from the user to stop the panoramic image capture.

If the current coverage of the images is not sufficient to generate the panoramic image, the proximate targets of the last target captured may be updated for the user in step 614. The proximate targets may be determined according to the image target graph generated in step 604. For example, if the last target captured is the initial target, the device display may be updated to also display the proximate targets that are neighboring the initial target node in the image target graph. Similarly, as each of the following images of the panoramic is captured in step 610, the device display is updated to also display the proximate targets of the last target captured. Each of the image targets added in 614 is a quality indicator that also provides an indication of whether the user device is properly positioned as discussed above.

In step 616 of this embodiment, a panoramic preview may be refreshed to include the image captured in step 610. As each of the individual images of the panoramic is captured in step 610, the panoramic preview may be updated with the latest captured image. The panoramic preview allows the user to view the overall progress of the panoramic image as the user device is repositioned to obtain each of the individual images. After the proximate targets and panoramic preview are updated, the method may return to step 606 to determine whether to capture the next image in a similar manner as discussed above with respect to steps 610-616. In some embodiments when multiple targets are displayed on the display of the user device, the user may be allowed to capture images for the targets in any order.

If it is determined that there is sufficient coverage for the panoramic image, the panoramic image may be generated in step 618 of this embodiment. The panoramic image may be stitched together from the individual images captured in step 610. In some embodiments, the image targets used to capture the individual images may also be used to generate the panoramic image. In this case, the image targets may be used to place and stitch the individual images together to form the panoramic image.

In step 620 of this embodiment, a quality rating of the panoramic image is determined. The quality rating of the panoramic image describes an overall quality of the panoramic image based on, for example, the quality factors of the individual images discussed above in step 610. In this example, other quality information related to the panoramic image may also be used to determine the quality rating such as dynamic range, contrast, sharpness, and color accuracy of the generated panoramic image.

Figure 7:
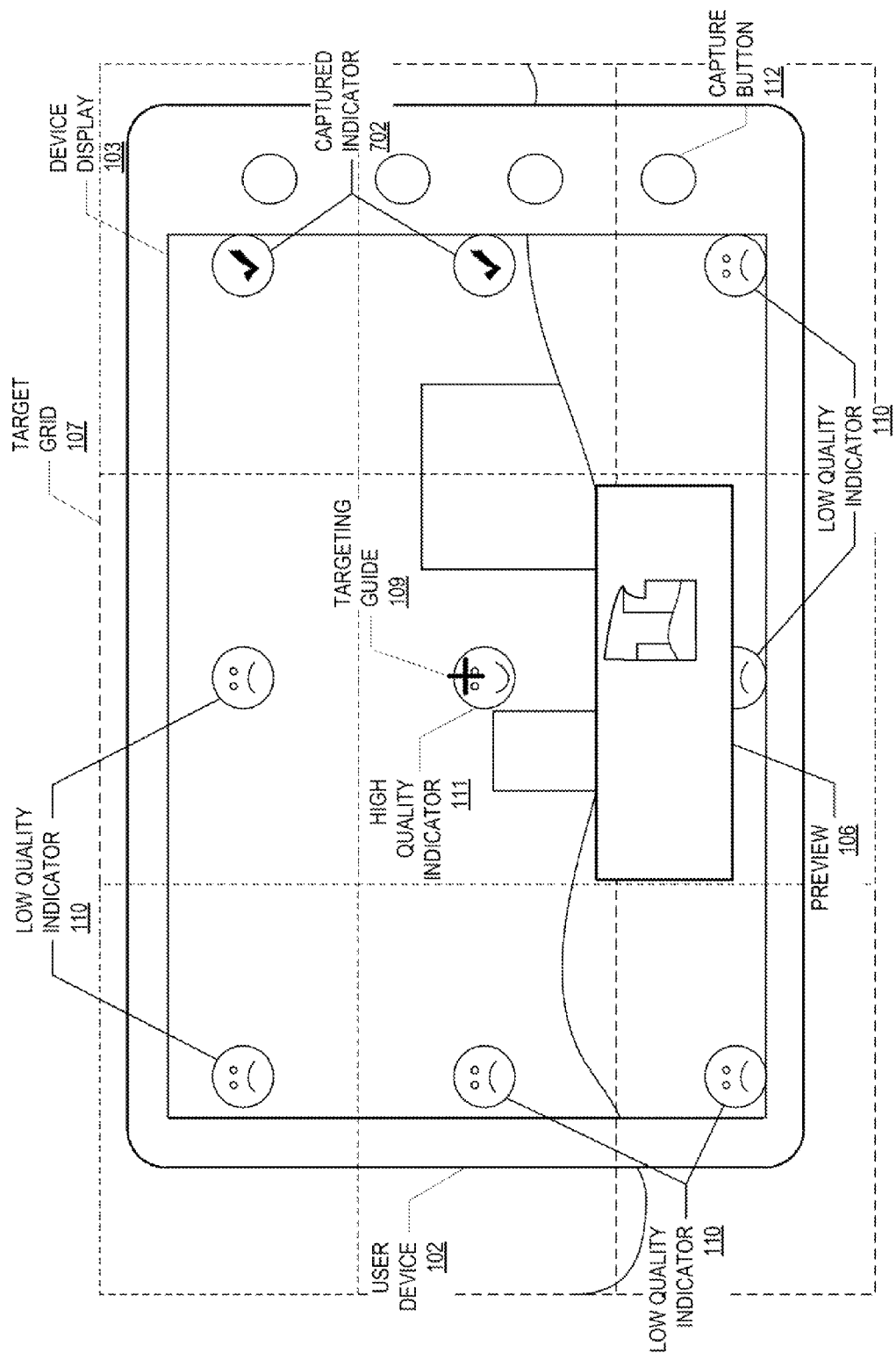
FIG. 7 shows an example user interface in accordance with one or more embodiments.

FIG. 7 shows an example interface in accordance with embodiments of obtaining panoramic images. More specifically, FIG. 7 shows an example user interface for performing panoramic image capture on a user device 102.

In FIG. 7, the user device 102 includes a device display 103 displaying an augmented video stream provided by a camera that may be substantially similar to the user device 102 described above with respect to FIGS. 1A-1D. FIG. 7 shows a target grid 107 for obtaining six individual images that are to be used to generate a panoramic image. The target grid 107 includes cells that correspond to, for example, target nodes of an image target graph. As each image is captured, a preview 106 of the panoramic image may be updated to include the captured images.

In some embodiments, individual images are obtained for each of the quality indicators (e.g., captured indicators 702, low quality indicators 110, and high quality indicator 111) as discussed above with respect to FIG. 6. The captured indicators 702 show the targets at which an image has already been captured. The low quality indicators 110 show the targets at which the user device is poorly positioned for capturing an image. The high quality indicator 111 shows the target at which the user device 102 is properly positioned for capturing an image. In this example, the user device 102 is properly positioned when the targeting guide 109 is within a threshold distance of the high quality indicator 111.

In this example after all the individual images are obtained, the six images are stitched together and included in a panoramic image. A quality rating of the panoramic image may be determined based on how closely centered and properly aligned the targeting guide 109 is with respect to the corresponding image target (e.g., low quality indicators 110, high quality indicator 111) when the individual images are captured.

In some embodiments of the invention, the user device 102 may present the quality rating to the user. The quality rating may be presented on a user interface of an application (e.g., camera application, social networking application, game, etc.) that is configured to monitor the quality ratings of panoramic images captured by the user device 102. For example, a camera application may monitor the quality ratings of panoramic images in order to provide the user with achievements or other rewards. In this example, the user's proficiency may be ranked by the camera application based on the quality ratings of the panoramic images captured by the user. In response to an increase in the user's proficiency, the camera application may modify operating parameters of the camera application such as the image quality threshold.

While obtaining panoramic images has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present embodiments may suitably comprise, consist or consist essentially of the elements disclosed and may be practiced in the absence of an element not disclosed.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

The invention claimed is:

1. A method of obtaining panoramic images by user devices, the method comprising:
generating, by one or more processors, a targeting guide for presentation on a display screen of a user device, the targeting guide configured to indicate to a user how to direct a camera of the user device in order to obtain a panoramic image;
generating, by the one or more processors, at least one targeting boundary for presentation on the display screen, the at least one targeting boundary including a horizontal boundary arranged to show an extent of images captured by the camera;
responsive to a capture signal, initiating image capturing by the camera;
monitoring, by the one or more processors during the image capturing, a position of the camera in accordance with the targeting guide and the at least one targeting boundary;
generating the panoramic image using the captured images in accordance with the monitored position;
determining a quality of positioning of the camera in accordance with the targeting guide and the at least one targeting boundary; and
generating at least one of a low quality indicator and a high quality indicator for presentation on the display screen to identify whether to adjust positioning of the camera during the image capturing, wherein either the low quality indicator or high quality indicator is generated when the targeting guide satisfies a threshold distance value.

2. The method of claim 1, further comprising generating a target graph that defines boundaries of images to be captured in order to generate the panoramic image.

3. The method of claim 2, wherein the target graph is generated in accordance with a current orientation and an angle of view of the camera.

4. The method of claim 1, further comprising superimposing one or more user interface elements along the display screen during the image capturing in relation to an image target grid.

5. The method of claim 4, wherein the image target grid includes cells corresponding to one or more target nodes of an image target graph, the image target graph defining boundaries of images to be captured in order to generate the panoramic image.

6. The method of claim 1, further comprising determining a quality rating of the panoramic image, the quality rating describing an overall quality of the panoramic image based on one or more quality factors of the captured images.

7. A system, comprising:
an imaging device;
a display screen;
one or more memories;
one or more processors operatively connected to the imaging device, the display screen and the one or more memories, the one or more processors being configured to:
generate a targeting guide for presentation on the display screen, the targeting guide configured to indicate to a user how to direct the imaging device in order to obtain a panoramic image;
generate at least one targeting boundary for presentation on the display screen, the at least one targeting boundary including a horizontal boundary arranged to show an extent of images captured by the imaging device;
responsive to a capture signal, initiate image capturing by the imaging device;
monitor, during the image capturing, a position of the imaging device in accordance with the targeting guide and the at least one targeting boundary;
generate the panoramic image using the captured images in accordance with the monitored position;
determine a quality of positioning of the imaging device in accordance with the targeting guide and the at least one targeting boundary; and
generate at least one of a low quality indicator and a high quality indicator for presentation on the display screen to identify whether to adjust positioning of the imaging device during the image capturing, wherein either the low quality indicator or high quality indicator is generated when the targeting guide satisfies a threshold distance value.

8. The system of claim 7, wherein the one or more processors are further configured to generate a target graph that defines boundaries of images to be captured in order to generate the panoramic image.

9. The system of claim 8, wherein the one or more processors are configured to generate the target graph in accordance with a current orientation and an angle of view of the imaging device.

10. The system of claim 7, wherein the one or more processors are further configured to determine a quality rating of the panoramic image, the quality rating describing an overall quality of the panoramic image based on one or more quality factors of the captured images.

11. A non-transitory computer readable medium having computer-executable program instructions embodied therein that, when executed, cause one or more computer processors to implement a method of obtaining panoramic images by user devices, the method comprising:
   generating a targeting guide for presentation on a display screen of a user device, the targeting guide configured to indicate to a user how to direct a camera of the user device in order to obtain a panoramic image;
   generating at least one targeting boundary for presentation on the display screen, the at least one targeting boundary including a horizontal boundary arranged to show an extent of images captured by the camera;
   responsive to a capture signal, initiating image capturing by the camera;
   monitoring a position of the camera in accordance with the targeting guide and the at least one targeting boundary;
   generating the panoramic image using the captured images in accordance with the monitored position;
   determining a quality of positioning of the camera in accordance with the targeting guide and the at least one targeting boundary; and
   generating at least one of a low quality indicator and a high quality indicator for presentation on the display screen to identify whether to adjust positioning of the camera during the image capturing, wherein either the low quality indicator or high quality indicator is generated when the targeting guide satisfies a threshold distance value.

12. The non-transitory computer readable medium of claim 11, wherein the method further comprises superimposing one or more user interface elements along the display screen during the image capturing in relation to an image target grid.

13. The non-transitory computer readable medium of claim 12, wherein the image target grid includes cells corresponding to one or more target nodes of an image target graph, the image target graph defining boundaries of images to be captured in order to generate the panoramic image.

14. The method of claim 1, further comprising updating the panoramic preview as additional images are captured by the camera.

15. The method of claim 1, further comprising generating a panoramic preview for presentation on the display screen during the image capturing.

16. The system of claim 7, wherein the one or more processors are further configured to generate a panoramic preview for presentation on the display screen during the image capturing.

17. The non-transitory computer readable medium of claim 11, wherein the method further comprises generating a panoramic preview for presentation on the display screen during the image capturing.

* * * * *